United States Patent
White et al.

(10) Patent No.: US 8,314,587 B2
(45) Date of Patent: Nov. 20, 2012

(54) METHOD AND APPARATUS OF STORED ENERGY MANAGEMENT IN BATTERY POWERED VEHICLES

(75) Inventors: Christopher A. White, Neshanic Station, NJ (US); Wonsuck Lee, Basking Ridge, NJ (US)

(73) Assignee: Alcatel Lucent, Paris (FR)

( * ) Notice: Subject to any disclaimer, the term of this patent is extended or adjusted under 35 U.S.C. 154(b) by 399 days.

(21) Appl. No.: 12/577,520

(22) Filed: Oct. 12, 2009

(65) Prior Publication Data

US 2011/0084664 A1    Apr. 14, 2011

Related U.S. Application Data

(63) Continuation-in-part of application No. 12/587,598, filed on Oct. 9, 2009, now abandoned.

(51) Int. Cl.
*H02J 7/00* (2006.01)
*H02J 7/14* (2006.01)

(52) U.S. Cl. ........................... 320/103; 320/115

(58) Field of Classification Search ........... 320/103, 320/104, 109, 111, 113, 115
See application file for complete search history.

(56) References Cited

U.S. PATENT DOCUMENTS

| | | | | |
|---|---|---|---|---|
| 5,488,283 | A * | 1/1996 | Dougherty et al. | 307/10.1 |
| 6,232,674 | B1 * | 5/2001 | Frey et al. | 307/10.1 |
| 2004/0195997 | A1 * | 10/2004 | Borrego Bel et al. | 320/103 |
| 2007/0282495 | A1 | 12/2007 | Kempton et al. | |
| 2009/0177595 | A1 | 7/2009 | Dunlap et al. | |
| 2009/0222143 | A1 | 9/2009 | Kempton | |

FOREIGN PATENT DOCUMENTS

EP        1 487 079 A2    12/2004
WO  PCT/US2010/050681    10/2011

OTHER PUBLICATIONS

Willett Kempton and Steven E. Letendre, *"Electric Vehicles as a New Power Source for Electric Utilities"*, Transpn Res.D, vol. 2, No. 3 pp. 157-175, 1997.

* cited by examiner

Primary Examiner — Samuel Berhanu
(74) Attorney, Agent, or Firm — M. I. Finston

(57) ABSTRACT

A secondary battery and charging system are provided within an electric car or other electric drive vehicle. The secondary battery may, e.g., be owned by the electric utility. The battery is removable and can be charged and discharged independently of the primary car battery system. The utility can use the secondary battery to implement vehicle-to-grid functionality.

9 Claims, 4 Drawing Sheets

METHOD AND APPARATUS OF STORED ENERGY MANAGEMENT IN BATTERY POWERED VEHICLES

CROSS REFERENCE TO RELATED APPLICATION

This application is a continuation-in-part of U.S. patent application Ser. No. 12/587.598 filed Oct. 9, 2009 now abandoned by C. White and W. Lee under the title, "Method and Apparatus of Stored Energy Management in Battery Powered Vehicles".

FIELD OF THE INVENTION

The invention relates to the storage and utilization of electricity in vehicles that derive at least some power from batteries.

ART BACKGROUND

It has long been known that distributed schemes for production, storage, and retrieval of electric energy can make electric power distribution by public utilities more cost effective. For example, small or medium-scale facilities storing energy in the form of charged batteries, pumped water, compressed gas, or the like can be connected to the electric power grid and used to add power to the grid during outages and periods of high demand. Conversely, the distributed storage facilities can draw energy from the grid during periods of excess production or low demand, and store the energy for future use. Economic incentives can be provided to the owners of the storage facilities. This can be advantageous to the utilities through a reduction in the fluctuation of demand for electric power. Thus, it can help them to meet their commitments for the delivery of electric power without making capital investments in excess production capacity. The term "load balancing" is often used to refer to schemes of this kind.

One example of a small-scale energy storage facility is the battery system in an electric drive vehicle. Such a battery system may be charged exclusively from the electric power grid, or it may be charged through on-board electrical generation (consuming liquid or gaseous fuel), or it may be charged through some combination of the two preceding methods. Although the electric-drive vehicles that have received the most attention recently are automobiles ("electric cars"), other electric drive vehicles of interest in this context include trucks, and possibly also boats and trains.

In so-called "vehicle-to-grid (V2G)" schemes, the batteries within electric cars (or other electric drive vehicles) are connected, at times, to the power grid and used for load balancing. Such schemes have been under discussion at least since the publication in 1997 of the paper by W. Kempton and S. E. Letendre, "Electric Vehicles as a New Power Source for Electric Utilities." *Transpn. Res.-D*, vol. 2, no. 3, (1997), pp. 157-175.

The premise of V2G is that the battery within an electric car represents an unused resource when the car is not being used. When deployed to a large portion of the population of a city, this unused resource has a significant electrical power storage capability. Therefore, the electrical power utility could charge or discharge the batteries of electric cars which are plugged into the power grid, e.g. while the owners are at work, shopping, or at home. The charging or discharging would be timed to reduce fluctuations in supply and demand, with the possible beneficial consequences that primary production capacity is used more efficiently and overall electrical consumption is reduced.

One drawback of V2G as currently envisaged is that it may have limited acceptability to consumers. That is, a typical consumer will consider it desirable to always maintain the battery in a full (i.e., fully charged) condition, whereas the utility company will want to alternately charge and discharge the battery according to fluctuations in supply and demand. This poses a problem not only because the consumer will view the utility company's use as denying him the full benefit of his property (i.e., the battery), but also because every car battery has a limited number of charge/discharge cycles, and the utility company's use will therefore reduce the lifetime of the battery.

Of course, the utility company may provide incentives to the consumer in the form of reduced electricity prices, or ownership of the batteries within the car may be transferred to the utility. Although this may overcome some resistance by consumers, the basic conflict between maintaining a full charge and permitting charge flexibility is left unresolved.

SUMMARY OF THE INVENTION

Our solution is to provide a secondary battery and charging system within an electric car or other electric drive vehicle. The secondary battery may, e.g., be owned by the electric utility. The battery is removable and can be charged and discharged independently of the primary car battery system. The utility can use the secondary battery to implement V2G functionality without the constraints on usage described previously. If, e.g., the secondary battery is not owned by the user, there is less cause for the user to resist participation in V2G.

Accordingly, in an embodiment, a power assembly includes a primary battery unit and a secondary battery unit that has no more than 20% the total discharge capacity of the primary battery unit and is removable from the primary unit. The power assembly further includes switching circuitry configured to selectively draw electric power from one or the other of the primary and secondary battery units, and switching circuitry configured to independently charge the primary and secondary battery units. By "independently" is meant that each battery unit can be charged without substantially affecting the charging rate of the other, and that at least one can be charged without charging the other.

The power assembly further includes a battery management system (BMS) and a controller configured to receive battery charge state information from the BMS. The controller is configured to control the charging or discharging of the batteries in response to local commands that are input from, e.g., the driver of the vehicle. The controller is also configured to permit remote control on condition that a remote entity has been authenticated, and to control the charging or discharging of at least the secondary battery unit in response to commands from the remote entity.

In a more particular embodiment, the controller is further configured to control the charging or discharging of at least the secondary battery unit subject to a policy that is stored locally, e.g. in the controller or elsewhere in the vehicle.

In some embodiments, the controller is user programmable, such that the locally stored policy is configurable or selectable by a local user such as the driver of the vehicle.

In some embodiments, the power assembly further comprises a communication unit configured to communicate the charge state of the secondary battery unit to a remote location.

In some embodiments, the communication unit is further configured to communicate the location of the secondary battery unit.

In some embodiments, the communication may provide dynamic updates to electrical pricing to the BMS. This information may be used to set a local charging policy.

DETAILED DESCRIPTION

Figure 1:
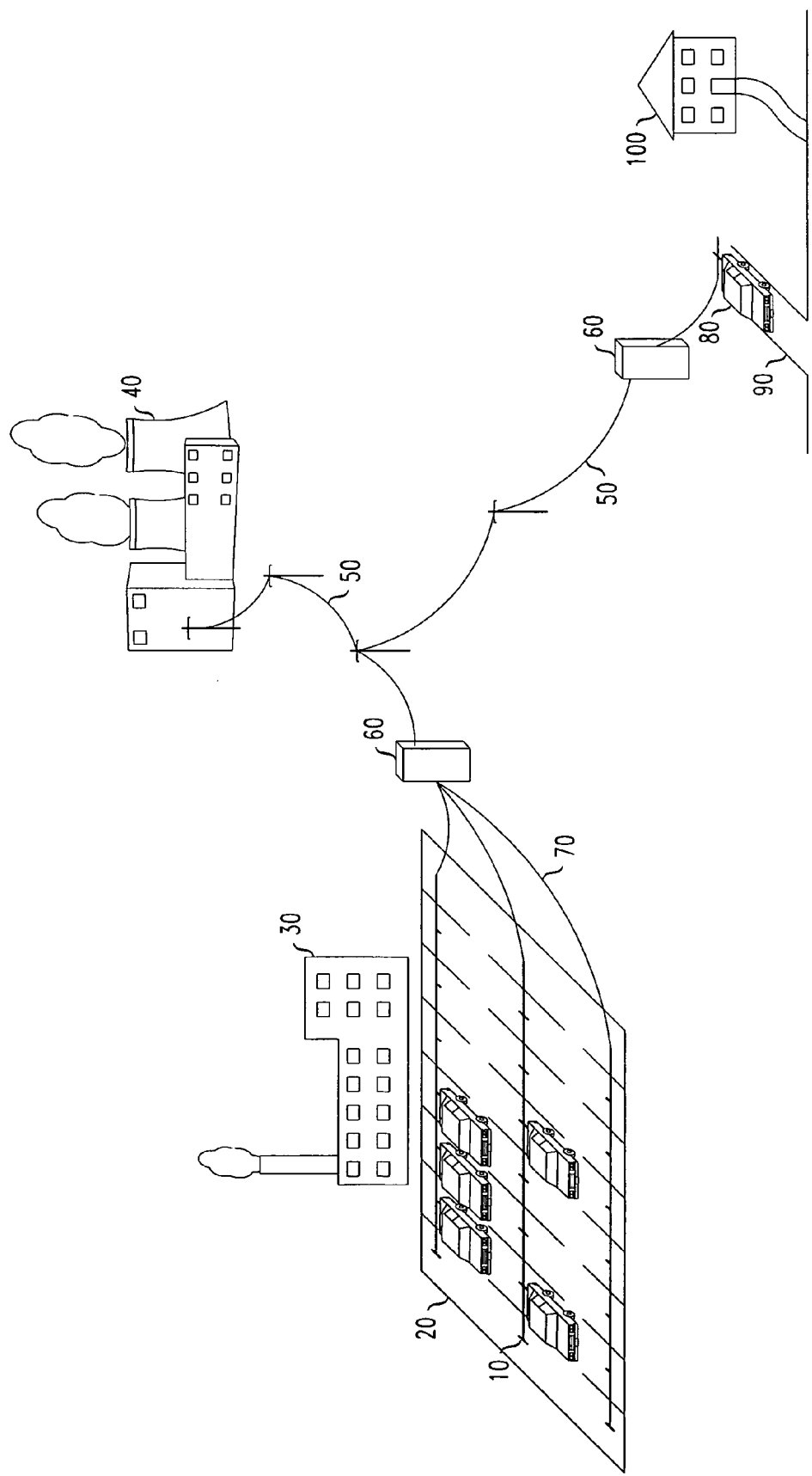
FIG. 1 shows a portion of a hypothetical electric power distribution network, in which electric cars can plug into the power grid.

FIG. 1 shows a typical scenario in which electric cars may be placed in contact with an electric utility for purposes of load balancing. Employee cars 10 are parked in parking lot 20 of workplace buildings 30. An electric power plant 40 is advantageously situated relatively nearby to minimize transport loss.

Power line 50 delivers electric power from the power plant to utility box 60, from which it is distributed to each of the parking spaces of lot 20 by conductive distribution lines 70. At each parking space, the electrical storage assembly of the respective car plugs into a receptacle (not shown) in electrical contact with one of the lines 70. The receptacle provides electrical continuity for charging and discharging the car's batteries.

It is also advantageous to provide a communication medium between the car and the electric utility, for example so that the utility can read the state of charge of the car batteries. Various alternative communication media are known. These include an additional communication cable to which the car may connect by plugging into the same receptacle that provides electrical continuity. Alternatively, communication may take place over the power cable using powerline carrier (PLC) techniques, or communication may take place wirelessly.

With further reference to FIG. 1, connection to the electric utility may also be provided to an electric car 80 when parked in driveway 90 of its owner's house 100. As described above, power line 50 delivers electric power to a utility box 60, to which the car connects via a plug and receptacle arrangement, for example.

In accordance with the illustrated scenario, power may be drawn from the cars in lot 20 during times of peak demand in the middle of the day, when the cars are sitting idle. On the other hand, power may be delivered for recharging car 80 during times of low demand in the middle of the night, while car 80 is likewise sitting idle.

Figure 2:
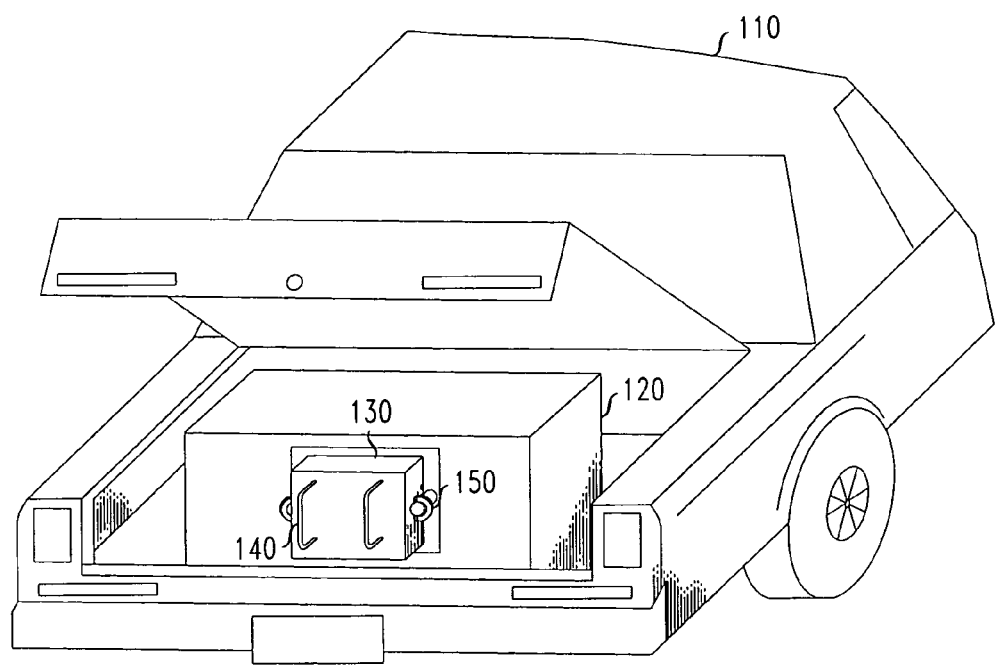
FIG. 2 is a partially schematic perspective rear view of an electric car, showing one example of a battery assembly including primary and secondary battery units.

Turning now to FIG. 2, there is illustrated a possible battery assembly according to an embodiment of the present invention. The battery assembly is installed in a rear compartment of car 110. As seen in the figure, a primary battery unit 120 is permanently installed in the car. By "permanently" is meant that it is not readily removable, but may be wholly or partly removable with significant effort, for purposes of replacement and repair.

As also seen in the figure, a secondary battery unit 130 is removably installed in the car. By "removably" is meant that the secondary battery unit can be removed with minimal effort, other than that necessary to operate a release mechanism and to handle an object that may weigh up to several hundred pounds. Various configurations are possible for holding and supporting the secondary battery unit 130. For example, unit 130 may be installed on a shelf or in a slot. It may be adjacent, on one or more sides, to banks of cells that constitute primary battery unit 120. To facilitate installation and removal, one or more clamp mechanisms 140 may be provided to releasably hold unit 130 in place. To facilitate handling, one or more handles 150 may also be provided.

Various storage battery technologies are known, that may be suitable for the purposes described here. These include lead-acid, nickel metal hydride, zinc bromine, and lithium-ion battery technologies. Of these various technologies, that currently having the greatest promise may be the lithium-ion battery technology, because it offers a relatively long life cycle, relatively rapid charge time, and relatively high energy density with relatively low weight. For example, Toshiba Corporation has announced a lithium-ion battery with a one-minute charge time to 80% of full capacity, a capacity of 600 mAh in a package of volume less than 90 cc, and a lifetime greater than 1000 charge-discharge cycles.

According to one possible arrangement between the car owner and the utility company, the secondary unit is the property of the utility company. When the car is plugged into the electrical grid, both the primary and secondary battery units are charged. However, the user of the vehicle is only charged for the electricity to charge the primary unit. To further compensate the user for transporting the secondary battery, the cost of the electricity for charging the primary unit may also be made lower than the current market rate.

The utility manages the charge on the secondary battery to limit fluctuations in the power grid. When power is plentiful the secondary batteries on all vehicles connected to the grid are charged. At peak demand, the batteries are discharged. Advantageously, the batteries in cars located near to the demand will be discharged to satisfy the demand minimizing transport loss in the network.

Charging the secondary battery unit can be accomplished with the vehicle charging system or it can simply be swapped, i.e., removed and exchanged for a fully charged battery unit. This provides a secondary benefit to the user. Swapping the secondary battery at a "charging station" will allow for a rapid recharge. Since the charge/discharge rate for the secondary battery might be much larger than a nightly charge for the primary battery, the fact that the battery can be easily replaced is useful, particularly since it might not last as long as the car.

The electric utility reaps a further benefit if it can track and independently manage the charge of the secondary battery. Under current implementations of V2G, the user and the utility compete for control of the battery charge. That is, the user always wants a full battery to have the longest driving range, whereas the utility wants to minimize fluctuations of the grid by partially discharging the battery when advantageous for that purpose. By dividing the battery assembly into a primary unit owned by the user and a secondary unit owned or at least controlled by the utility, the conflict between user and utility is at least partially resolved.

Even greater benefits may be realized if the secondary battery unit is given the ability to communicate its current state of charge, and possibly even its location, to the utility company. From the communicated information, the utility company may plan the times and places for charging or discharging secondary battery units, so as to optimize its load balancing.

Incentives to the user to cooperate in an arrangement as described above include lower prices for electrical power, and the availability of the secondary battery unit to increase the car's range between recharges, at least in emergency situations (although possibly at a higher cost per kwh of electricity).

If communication is enabled between the utility company and the car, the user can be continually updated about the (possibly time-varying) cost for using the secondary battery unit. This aids the user by promoting economically efficient use of the secondary battery unit, and also aids the utility company by affording it greater flexibility in pricing. It should also be noted in this regard that with respect to consumption by the user of the stored energy in the secondary battery unit, the cost of delivery to the point of use is borne by the user, not by the utility company. This provides a further benefit to the utility company.

Figure 3:
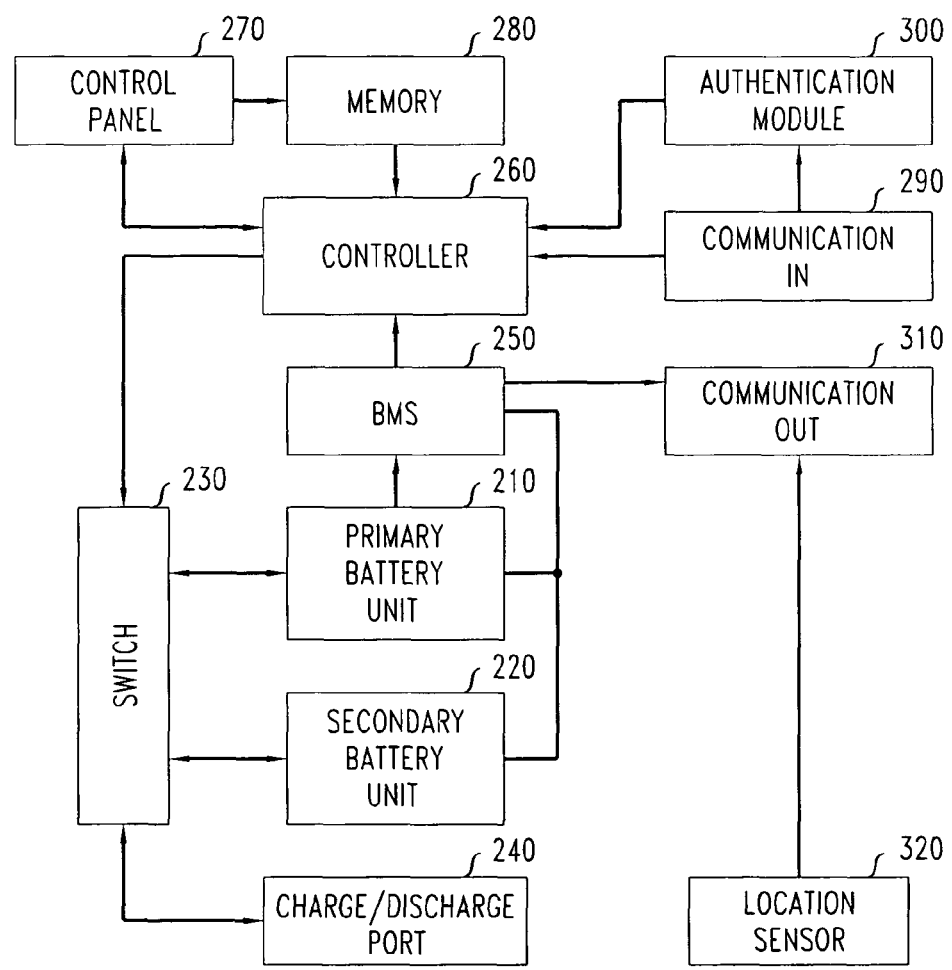
FIG. 3 is a block diagram illustrating an example battery system according to the principles described here.

Shown in FIG. 3 is an example of a battery assembly according to the principles described above, and including modules for communication and control. This example is not meant to be limiting, but merely illustrative of one among many possible arrangements useful for achieving the results to be described below. In particular, it should be borne in mind that those functions that involve the processing of data, communications, and other forms of information may be carried out under the control of programs implemented in any combination of hardware, software, and firmware, and may equivalently be carried out by general purpose computers, specialized digital processors, or specialized circuitry. Any and all such implementations should be regarded as equivalents for performing the functions that are to be described.

As seen the figure, a primary battery unit 210 and a secondary battery unit 220 are provided. The battery units are connected through switch 230 to charge/discharge port 240, which may, for example, be connected to a utility company's power distribution network through a plug-and-receptacle combination as described above.

Switch 230 is configured so that under control, it may select one or the other, or both, of battery units 210, 220 for charging or discharging. As noted above, it is advantageous for the total discharge capacity of the secondary unit to be no more than 20% of the total discharge capacity of the primary unit. The reason is that if the secondary capacity is substantially more than 20%, the user of the car faces economic inefficiency because he lacks sufficient control over the motive resources of his vehicle.

As noted above, switch 230 is advantageously configured to selectively draw electric power from one or the other of the primary and secondary battery units, and to independently charge the primary and secondary battery units. In particular, it may be useful for switch 230 to permit a choice of charging only the primary battery unit, only charging the secondary battery unit, or charging both battery units simultaneously.

Also shown in the figure is Battery Management System (BMS) 250. BMS systems have long been used in the art for various functions such as monitoring the state of charge of the batteries and their voltages and current flows, computing battery age indications, balancing the batteries, and protecting the batteries from overcurrents, overvoltages during charging, and undervoltages during discharge. As seen in the figure, BMS 250 forwards battery state information to controller 260 and also to outbound communication module 310.

With further reference to FIG. 3, controller 260 controls switch 230 for charging and discharging the battery units, in response to various inputs which are to be described below. Controller 260 also forwards information to control panel 270 for display to the user. The displayed information may include current pricing information for use of the energy stored in the battery units, as well as state information for the battery units.

It should be noted that for discharging a battery unit into the power grid, it will generally be necessary to employ an inverter to convert direct current from the batteries into alternative current that is useable by the power grid. In the example illustrated here, control of the inverter (not shown) is by controller 260.

Control panel 270 provides the user with information about the current state of the battery system, and may also provide account information, for example the cost of electrical energy expended within a specified time period, pricing for the use of the secondary battery unit, the cost of the next recharge, and the like. Those skilled in the art will of course appreciate that the control panel may usefully provide many further types of information to the user.

Control panel 270 also provides the user with various ways to exert local control over the utilization of the battery units. For example, the user may elect to begin drawing on the secondary battery unit.

Depending on what arrangements have been made with the utility company, the user may also be able to choose among various policies relating to pricing and electrical usage patterns. For example, the costs to the user might depend on whether the user has agreed to recharge only during discount periods, or whether recharging during premium periods is also requested. Similarly, some costs to the user might depend on the extent to which the user wishes to have control over energy storage in the secondary battery unit, or the extent to which the user is willing to cede control to the utility company over energy storage in the primary battery unit.

By using control panel 270, the user may be able to select among the various policies, and indicate which should be currently in force. Information about selected policies, and other user-configured information, may be stored in memory 280. Communication input module 290 is configured to receive information from the utility company. As noted, any of various well-known wired or wireless communication technologies may be used to provide connectivity between module 290 and the utility company. Module 290 may receive information useful to the user, such as pricing information, and forward it to control panel 270 for display. Module 290 may also receive control information from the utility company, and forward it to controller 260 to be put into effect. Control information may include, for example, instructions (according to the agreed policy) to charge the primary or secondary battery unit, or to discharge (for load balancing in the utility network) the secondary battery unit.

For security, it is desirable to include an authentication module 30U that excludes all but authorized entities to exert control of the kind described above. Accordingly, module 300, communicating with the remote entity via communication module 290, executes any of various well-known authentication protocols. Such protocols may be as simple as checking a password, or as complex as those protocols based on pseudorandom number generation or other cryptographic techniques. In fact, the authentication procedure may be carried out, in part, by a cell phone or other wireless device, which then communicates a permission or denial message to module 300.

It should be noted in this regard that although the remote entity that exerts control in this example is the utility company, any of various other remote entities could also be authorized in the same manner. For example, the employees whose cars are parked on the site of a large company could agree that the company may draw on their secondary battery units to help power the company air conditioning system during midday periods of high demand.

Communication output module 310, as seen in the figure, is configured to transmit battery state information to the utility company. As noted above, it may also be useful to the utility company to be able to track the location of the secondary battery unit. For that purpose, location sensor 320, which may for example be a GPS receiver, communicates location information to communication module 310.

Communication output module 310 may also facilitate communication from the user to the utility company by forwarding, for example, the user's currently selected policy. For that purpose, there is a direct or indirect connection from control panel 270 to module 310 (omitted from the figure for simplicity of presentation).

Figure 4:
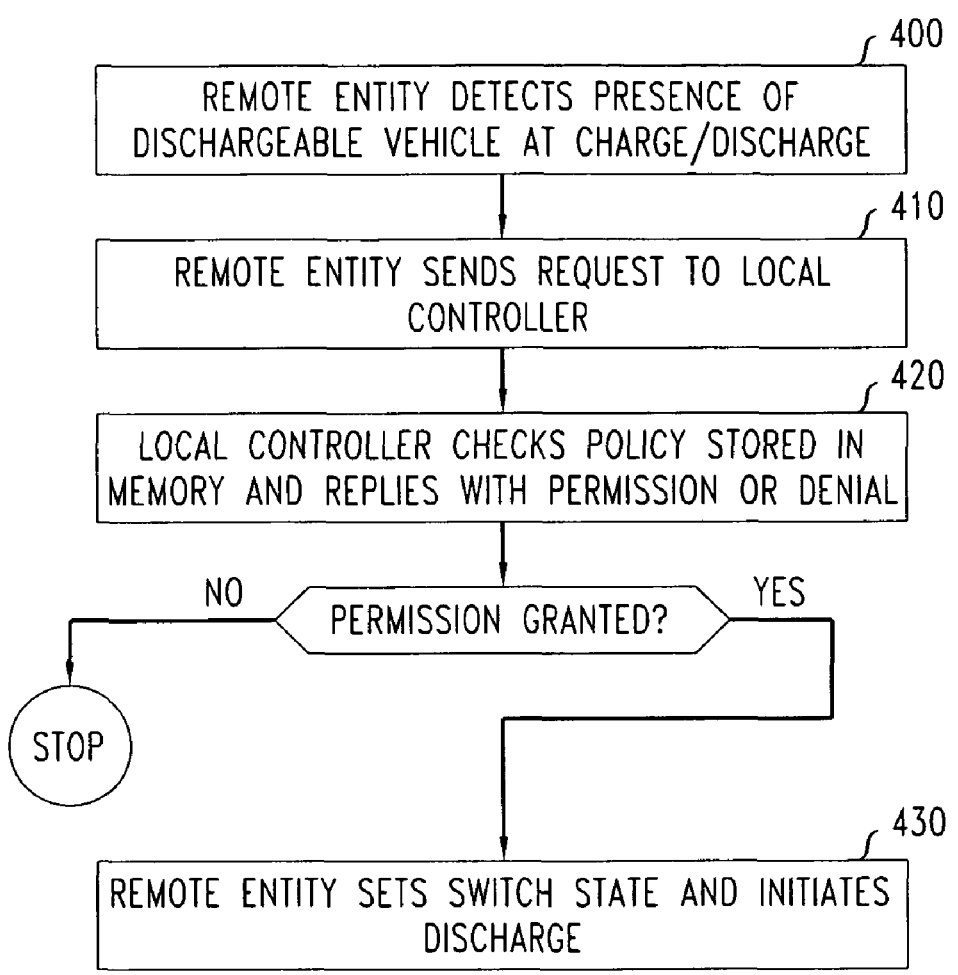
FIG. 4 is a flowchart illustrating a method by which a remote entity may discharge a secondary battery unit.

When the utility company (or other remote entity) wishes to draw on the charge in the secondary battery unit, it may do so according to the exemplary procedure charted in FIG. 4, to which attention is now directed. At step 400, the remote entity detects that an electric drive vehicle is at a location where battery discharge into the power grid is possible. At step 410, the remote entity contacts a local controller, such as controller 260 with a request to begin discharge. At step 420, the controller accesses memory 280 to check the policy currently in force. If the request is consistent with the current policy, the remote entity receives a message that the request is granted. Then, at step 430, the remote entity causes switch 230 to be placed in a state which permits discharge, into the power grid, solely of the secondary battery unit.

What is claimed is:

1. Apparatus, comprising:
    a primary battery unit;
    a secondary battery unit that has no more than 20% the total discharge capacity of the primary battery unit and is removable from the primary unit;
    a switching circuit configured to permit at least the choice of charging the primary battery unit without charging the secondary battery unit and the choice of charging the secondary battery unit without charging the primary battery unit, and further configured to permit selective discharging of one or the other of said battery units at a given time;
    a battery management system (BMS); and
    a controller configured to receive battery charge state information from the BMS, and to control the charging and discharging of the battery units, wherein:
    the controller is configured to respond to local and remote commands for charging the battery units;
    the controller is configured to respond to at least local commands for discharging the primary battery unit; and for discharging the secondary battery unit, the controller is configured to respond to remote commands from a remote entity, subject to authentication of the remote entity and subject to local permission to discharge the secondary battery unit.

2. The apparatus of claim 1, further comprising a local memory for policy information, and wherein the controller is configured to control the charging or discharging of at least the secondary battery unit subject to a policy stored in the memory.

3. The apparatus of claim 2, further comprising a control panel for user configuration of the locally stored policy information.

4. The apparatus of claim 1, further comprising a communication unit configured to communicate the state of charge of the secondary battery unit to a remote location.

5. The apparatus of claim 4, further comprising a location sensor cooperative with the communication unit to communicate the location of the secondary battery unit to the remote location.

6. The apparatus of claim 1, comprising an electric drive vehicle in which motive energy is provided by the primary and secondary battery units.

7. The apparatus of claim 1, wherein the primary and secondary battery units are configured to provide motive energy to an electric drive vehicle.

8. The method of claim 1, wherein the switching circuit is configured to permit the further choice of concurrently charging both the primary battery unit and the secondary battery unit.

9. A method, comprising:
    detecting that an electric drive vehicle having a primary battery unit and a secondary battery unit is situated at a location where at least the secondary battery unit can be discharged into an electric power grid;
    detecting a state of charge of the secondary battery unit; wherein the secondary battery unit has no more than 20% the total discharge capacity of the primary battery unit,
    transmitting one or more messages to a local controller on the vehicle, said messages containing authentication information and a request to initiate a battery discharge, said request being conditional on sufficient charge having been detected;
    receiving one or more reply messages from the local controller; conditionally on the reply messages indicating that authentication is successful and permission is granted to initiate a battery discharge, causing the vehicle to enter a switching state in which only the secondary battery unit can be discharged; and
    initiating a discharge of the secondary battery unit into the power grid.

* * * * *